United States Patent [19]

McCuan

[11] Patent Number: 4,775,011

[45] Date of Patent: Oct. 4, 1988

[54] HOOF PAD

[76] Inventor: David B. McCuan, 1368 Harrodsburg Rd., Lawrenceburg, Ky. 40352

[21] Appl. No.: 893,151

[22] Filed: Aug. 5, 1986

[51] Int. Cl.$^4$ ............................ A01L 1/00; A01L 7/02
[52] U.S. Cl. ......................................... 168/12; 168/28
[58] Field of Search ...................... 168/12, 14, 26, 28

[56] References Cited

U.S. PATENT DOCUMENTS

| | | | |
|---|---|---|---|
| 851,243 | 4/1907 | Manley | 168/28 |
| 903,043 | 11/1908 | Barber | 168/28 |
| 918,032 | 4/1909 | Flaherty | 168/28 |
| 1,502,441 | 7/1924 | Roberts | 168/28 |

FOREIGN PATENT DOCUMENTS 885324 8/1953 Fed. Rep. of Germany ........ 168/12

Primary Examiner—Robert P. Swiatek
Attorney, Agent, or Firm—Charles L. Thomason

[57] ABSTRACT

A flexible, resilient wedge pad for hooved animals, particularly the horse, comprising a semicircular toe portion used in connection with a semicircular half-shoe to attach the pad to the forward rim or toe of the hoof and a heel portion that extends linearly between the quarters and bars of the hoof, covering the frog, and terminating behind the heel, directly below the rearmost part of the heel bulbs. The wedge pad increases in thickness from toe to heel, with the heel being thick enough to elevate the quarters, bars and bulbs and prevent contact thereto with the ground. Groundstriking forces are cushioned and placed upon the frog.

4 Claims, 2 Drawing Sheets

HOOF PAD

FIELD OF THE INVENTION

The present invention relates to horse shoe pads.

BACKGROUND OF THE INVENTION

In the art of fabricating and fitting shoes for horse's hooves, prior inventors have described padded shoes and pads used in combination with shoes. Prior pads cushioned and absorbed groundshocks to the hoof or to the frog or to the heel. Structurally, the pads covered the entire hoof including the toe, quarters, bars, frog and heel, and these prior designs were secured along the inner or outer circumference of the entire hoof, using various attaching means. The prior art does disclose wedge pads that elevate the heel. No known prior art construction utilizes a wedge pad, which neither covers nor attaches to the quarters or bars of the hoof, but which elevates them and thereby eliminates injurious groundshocks to those parts, as well as providing other beneficial objects described further herein. The prior art offers no wedge pad that extends beyond the heel beneath the bulbs, to elevate, cushion and protect the bulbs.

SUMMARY OF THE INVENTION

The present invention used with a horse shoe is a wedge pad that covers and attaches to the front half of the hoof, elevates and cushions the heel, bulbs, and frog, lifts the quarters and bars so they never contact the ground in stride, thus eliminating injurious ground shocks to all parts of the foot and hoof.

The pad is formed of a flexible, resilient material in a wedge having a thickness that increases from the toe to the heel of the horse. In a bottom view, the pad has a shape similar to the silhouette of a mushroom and stem, with the stem over the heel and bulbs, and the cap over the toe.

In motion, a horse's hoof strikes the ground heel first, then onto the quarters, and finally onto the front or toe of the hoof. In full stride, the bulbs hit first. Impacts cause abrasions to the heel, as well as to the bulbs above the heel. Also, impact injuries occur including quarter cracks, and cracks along the rim wall of the hoof, and bruises.

In the present invention, the thick heel portion at the rear of the wedge projects between the quarters, over the frog, terminating beyond the heel, fully beneath the bulbs. The thick pad elevates the heel so that the quarters and bars do not contact the ground, thus eliminating groundshocks to those parts, while cushioning the frog, heel and bulbs. In stride, the thickest part of the pad under the bulbs first strikes the ground, placing the primary impact upon the cushioned heel and the frog, but the elevated quarters and bars never hit, and then the front half of the hoof, covered with the pad and half shoe, strike to complete the stride.

Accordingly, one object of the invention is to eliminate impacts and injurious groundshocks to the quarters, bars, frog, heel and bulbs, and to cushion the forces then placed on the heel, frog and forward half of the hoof. Further objects include elevating the heel to conform the angle defined by the foot with the angle of the shoulder, and additionally to promote proper heel spreading, together with the further purposes of the illustrative embodiments described herein.

DESCRIPTION OF THE PREFERRED EMBODIMENTS

Figure 1:
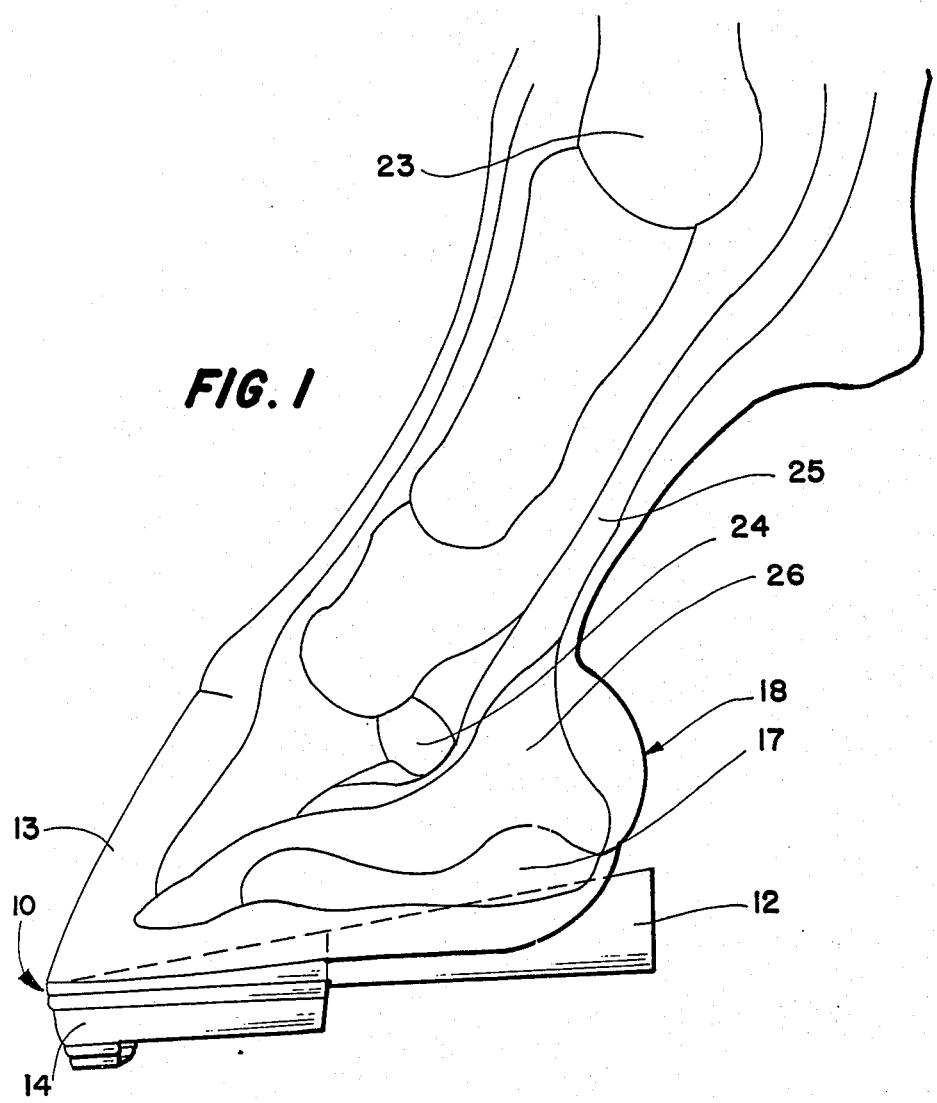
FIG. 1 is a side sectional view of the wedge hoof pad and abbreviated shoe attached to a horse hoof.

Referring to the drawings, in FIG. 1, the wedge pad is affixed to the forward half of the horse hoof 13 using the nails 15 that secure the abbreviated horseshoe 14. The thickness of the wedge pad increases from the thinner toe portion 10, as it passes between the quarters 16 and bars 22, over the frog 17, to the thickest part, the heel portion 12 that rests at the rear of the hoof under the bulbs 18.

Figure 2:
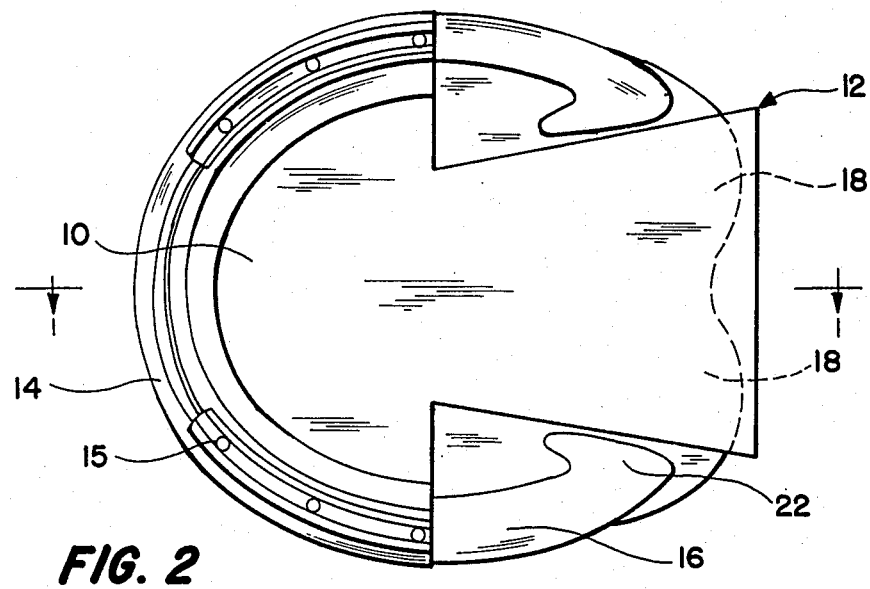
FIG. 2 is a bottom plan view of the present invention as shown in FIG. 1.
Figure 3:
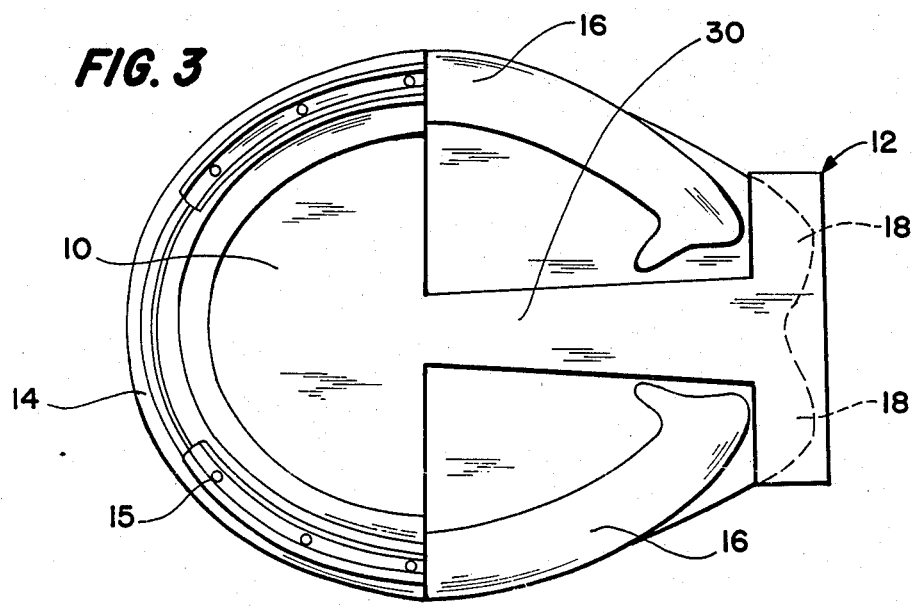
FIG. 3 is a bottom view, of a second embodiment of the present invention.

In FIG. 2, the present invention is shown applied to the bottom of the hoof as in FIG. 1, using the same reference numerals. In FIG. 3, another embodiment of the present invention is shown of the wedge pad where the space between the quarters 16 is quite narrow, and so the heel portion 12 is equally narrow, but it widens at the rear to fully cover the bulbs 18.

The improved hoof pad is formed of a flexible, yet resilient material. The pad, while flexible, must have sufficient rigidity to retain generally a planar shape and parallel alignment in relation to the hoof during every phase of the horse's stride. Successful results, in terms of the flexibility, resiliency and cushioning, have been obtained using E.P.D.M. rubber of between 50 to 100 durometer, preferably 85 durometer, and rated at approximately 2000 p.s.i.

The wedge pad must have sufficient thickness to elevate the heel so that the quarters and bars will not touch the ground. An elevation of about ⅜ to ½ of an inch above the ground is preferred. One guiding consideration is that the wedge elevate the heel so as to obtain proper conformance, that is, to make the angle of the pastern and the foot equal to the slope of the shoulder.

The improved hoof pad has a heel portion that fits inside the quarters and against the frog. The heel portion of the pad extends back fully beneath the bulbs of the heel. When a horse is in full stride, the bulbs would be the part of the hoof that first strike the ground. The rear terminus of the pad is just behind the bulbs, so that the bulbs are covered and cushioned by the pad. The initial ground contact is made to the heel portion of the wedge pad. A guiding consideration is that the rear terminus of the pad should align with the vertical line of the cannon bone 23.

The present invention helps to maintain a sound, normal hoof and leg structure, and to prevent or remedy several common abnormalities. Such maladies can incapacitate a horse indefinitely or even permanently.

Horses can suffer quarter cracks in the wall of the hoof that cause extreme pain, and which persists until the crack grows completely out of the hoof. Quarter cracks result from the hoof being rolled under and compressed inward. The wedge pad in the present invention elevates the quarters and bars completely off the ground, and thus, eliminates from those parts, the forces that cause quarter cracks. Also, by elevating and eliminating froces to the quarters and bars, the wedge pad enables a horse with existing quarter cracks to run without pain, or the threat of further cracking. Using the wedge pad, the groundstriking force is placed primarily upon the frog. Anatomically, the frog is adapted naturally to accept such forces. The frog is an elastic horny pad, generally triangular, this is situated in the space between the quarters and bars. In the foot, the frog contacts the digital cushion 26, and these parts naturally absorb groundshocks.

Many horses have underslung or abnormal heels. Generally, the heel includes the rear half of the hoof including the quarters, bars, buttresses, and back to the heel bulbs. The wedge pad of the present invention, which extends just to the rear of the heel bulbs and inside of the bars of the hoof wall, places all concussions upon the pad and the frog, and so, there is no force or pressure upon the walls of the heels. This allows the walls to grow back properly, and also prevents crushed heels. With underslung heels, the bulbs are lower. This causes greater contact between the ground and the bulbs. As a consequence, the bulbs become burned and cut, which reduces the capacity to run at full stride. The present pad elevates, cushions and covers the bulbs, and accepts the impacts. Thus, the bulbs are protected and allow the animal to run without pain, while permitted a sound heel to grow back. Underslung heels are associated with poor conformation, long pasterns, or long toes. The present invention permits proper elevation to adjust the conformation on horses with underslung heels or associated conditions. Poor conformation puts the foot at an improper angle. This places added strain on the lower leg. The range of flexion and extension is increased during stride, causing early fatigue and strains. The present invention provides elevation to the point of proper conformation, thus eliminating such fatiguing pressures.

When horses' are subjected to constant concussions with a hard surface, including a race track, they can develop acute or chronic laminitis. The present invention cushions all impacts, and places the concussion force upon the frog, while removing injurious ground shocks from the wall of the hoof and the lamina within said wall.

Navicular disease affects the navicular bone and can cause great pain and lameness. As the body weight passes over the foot in motion, the navicular bone 24 is forced posteriorly against the deep flexor tendon 25. Navicular disease causes narrow heels, and with a decrease in the area of the foot, over which the weight and concussions are distributed, then the pressure per unit area increases upon the flexor tendon and navicular bone. In the present invention, the wedge pad makes first contact with the ground, and instead of the pressure being transmitted through the small area of the narrow heel and hoof wall, the cushioned impact is placed upon the frog. Forces that aggravate navicular disease and place added strain on the navicular bone and deep flexor tendon are reduced. Also, the heels can grow and expand properly.

The present invention is attached to the hoof solely along the toe portion of the pad. The heel portion is unattached, and the pad neither covers nor attaches to the quarters or bars. Attachment to these parts would restrict growth and expanding. In the prior art, full pads were used with full shoes. When fully attached, these prior articles would not accommodate spreading and growth. The present invention being unattached at the heel permits and encourages heel spreading. The present invention provides the same benefits to horses with contracted feet or narrow heels. In some cases, the heel is so narrow that the invention as depicted in FIG. 3 must be used. The intermediate or stem 30 portion of the pad must extend between the narrow heel walls, but the heel portion must then widen to fully cover and protect the bulbs of the heel. The portion passing through the narrow space between the quarters and bars may be cut in the vertical plane with a bevel edge to force the desired spreading when the pad engages the quarters.

In the embodiments of the present invention, any of various attaching means known in the art may be used. In the drawings, the present invention is shown attached using an abbreviated or half shoe, 14, and several nails, 15. Any commonly available shoe could be adapted by cutting off the parts of the shoe that normally attach to the quarters and heel. The abbreviated shoe and the outer edge of the toe portion of the wedge are essentially semicircular and both conform circumferentially to the forward part of the hoof.

It will be still further understood by those skilled in the art that many variations and modifications may be made of the present invention without departing from the spirit and scope thereof.

What is claimed is:

1. A wedge pad for a horse's hoof said hoof having a toe, quarters, bars, frog, heel, and bulbs, said frog being within the space between the quarters and bars, said hoof to contact a support footing, comprising:
    a toe portion and a heel portion; said toe portion essentially semicircular to connect only to the toe of the hoof and said heel portion fitting between the quarters and bars and up and against the frog and said heel portion having a predetermined thickness for preventing the quarters, bars and bulbs from contacting the support footing further comprising an abbreviated semicircular shoe and attaching means wherein said toe portion is imposed between the toe of the hoof and said shoe, and said wedge pad and said shoe are attached solely to the toe of said hoof.

2. A wedge pad as in claim 1 wherein the predetermined thickness of said heel portion elevates the quarters approximately one-half inch above the support footing.

3. An improved wedge pad for connection to an animal's hoof said hoof having a toe, quarters, bars, frog, heel and bulbs, and for being imposed between said hoof and a support footing, the improvement comprising:
    a heel portion more narrow than the quarters to fit up and against the frog and having opposing cutaway portions for said quarters and bars and terminating below said bulbs and having a predetermined thickness that prevents impact between the support footing and said quarter and bulbs, further comprising a toe portion and a semicircular shoe; wherein said shoe covers only the toe and the forward half of the hoof and said wedge pad and said shoe are attached to the hoof solely along the toe portion.

4. A wedge pad for a horse's hoof said hoof having a toe, quarters, bars, frog, heel and bulbs, said frog being within the space between the quarters and bars, said hoof to contact a support footing, comprising:
    a toe portion, a stem portion, and a heel portion; said toe portion conforming circumferentially to said toe of said hoof and said stem portion extending linearly between the quarters and bars and said heel portion fitting inside the quarters and up and against the frog and extending beneath the bulbs, said heel portion having a predetermined thickness that prevents the quarters, bars and bulbs from contacting the support footing wherein said heel portion terminates directly beneath the center line of the cannon bone of the horse and further comprising an abbreviated semicircular shoe; wherein said shoe covers only the toe and the forward half of the hoof and said wedge pad and said shoe are attached to the hoof solely along the toe portion.

* * * * *